US012766940B2

(12) United States Patent
Wu et al.

(10) Patent No.: US 12,766,940 B2
(45) Date of Patent: Oct. 20, 2026

(54) HOUSING, POWER SUPPLY DEVICE, AND VEHICLE

(71) Applicants: CONTEMPORARY AMPEREX TECHNOLOGY CO., LIMITED, Ningde (CN); Contemporary Amperex Intelligence Technology (Shanghai) Limited, Shanghai (CN)

(72) Inventors: Kai Wu, Ningde (CN); Xiaowei Sun, Shanghai (CN)

(73) Assignees: CONTEMPORARY AMPEREX TECHNOLOGY CO., LIMITED, Ningde (CN); CONTEMPORARY AMPEREX INTELLIGENCE TECHNOLOGY (SHANGHAI) LIMITED, Shanghai (CN)

( * ) Notice: Subject to any disclaimer, the term of this patent is extended or adjusted under 35 U.S.C. 154(b) by 160 days.

(21) Appl. No.: 18/956,814

(22) Filed: Nov. 22, 2024

(65) Prior Publication Data

US 2025/0083511 A1 Mar. 13, 2025

Related U.S. Application Data

(63) Continuation of application No. PCT/CN2022/115114, filed on Aug. 26, 2022.

(51) Int. Cl.
*B60K 1/04* (2019.01)
*B60L 50/60* (2019.01)
(Continued)

(52) U.S. Cl.
CPC ................ *B60K 1/04* (2013.01); *B60L 50/64* (2019.02); *B60L 50/66* (2019.02);
(Continued)

(58) Field of Classification Search
CPC .............. B60K 1/04; B60K 2001/0405; B60K 2001/0416; B60K 2001/0433;
(Continued)

(56) References Cited

U.S. PATENT DOCUMENTS

2004/0235315 A1 11/2004 Masui et al.
2008/0251246 A1 10/2008 Ohkuma et al.
(Continued)

FOREIGN PATENT DOCUMENTS

CN 102390246 A 3/2012
CN 104332571 A 2/2016
(Continued)

OTHER PUBLICATIONS

The World Intellectual Property Organization (WIPO) International Search Report for PCT/CN2022/115114 Apr. 13, 2023 5 Pages (including translation).

(Continued)

*Primary Examiner* — Timothy Hannon
(74) *Attorney, Agent, or Firm* — ANOVA LAW GROUP, PLLC

(57) ABSTRACT

A housing that is configured to be mounted on a vehicle body of a vehicle includes a housing body, a first mounting part, and a second mounting part, where the housing body has an accommodating cavity; the first mounting part is provided on the housing body and is configured to fix a battery in the accommodating cavity; and the second mounting part is provided on the housing body and is configured to fix a plurality of electronic modules in the accommodating cavity.

6 Claims, 8 Drawing Sheets

(51) Int. Cl.

| | |
|---|---|
| ***B60L 50/64*** | (2019.01) |
| ***H01M 50/204*** | (2021.01) |
| ***H01M 50/244*** | (2021.01) |
| ***H01M 50/249*** | (2021.01) |
| ***H01M 50/262*** | (2021.01) |
| *B60R 16/023* | (2006.01) |

(52) U.S. Cl.
CPC ....... *H01M 50/204* (2021.01); *H01M 50/244* (2021.01); *H01M 50/249* (2021.01); *H01M 50/262* (2021.01); *B60K 2001/0433* (2013.01); *B60R 16/0239* (2013.01); *H01M 2220/20* (2013.01)

(58) Field of Classification Search
CPC . B60K 2001/0438; B60L 50/64; B60L 50/66; B60R 16/0239; H01M 50/204; H01M 50/244; H01M 50/249; H01M 50/262; H01M 2220/20
See application file for complete search history.

(56) References Cited

U.S. PATENT DOCUMENTS

| | | | | |
|---|---|---|---|---|
| 2013/0020139 | A1 | 1/2013 | Kim et al. | |
| 2015/0243946 | A1 | 8/2015 | Ahn | |
| 2017/0174160 | A1* | 6/2017 | Uraguchi | B60R 16/04 |
| 2018/0072146 | A1 | 3/2018 | Narisawa et al. | |
| 2019/0232832 | A1* | 8/2019 | Bhatia | H01M 50/229 |
| 2020/0028136 | A1 | 1/2020 | Wagner et al. | |
| 2023/0030846 | A1* | 2/2023 | Takemoto | B60R 16/0239 |

FOREIGN PATENT DOCUMENTS

| | | | |
|---|---|---|---|
| CN | 205406600 | U | 7/2016 |
| CN | 205439943 | U | 8/2016 |
| CN | 106891709 | A | 8/2017 |
| CN | 107472006 | A | 12/2017 |
| CN | 107887536 | A | 4/2018 |
| CN | 209312882 | U | 8/2019 |
| CN | 209454691 | U | 10/2019 |
| CN | 214043868 | U | 8/2021 |
| CN | 113666684 | A | 11/2021 |
| CN | 114714877 | A | 7/2022 |
| CN | 216942970 | U | 7/2022 |
| EP | 4001077 | A1 | 5/2022 |
| EP | 4001078 | A1 | 5/2022 |
| JP | H01199832 | A | 8/1989 |
| JP | 2015217820 | A | 12/2015 |
| JP | 2022038128 | A | 3/2022 |

OTHER PUBLICATIONS

The Japan Patent Office (JPO) Notice of Reasons for Refusal for Application No. 2024-565276 Dec. 2, 2025 6 Pages (including translation).

The European Patent Office (EPO) The Extended European Search Report for Application No. 22956114.7 May 20, 2025 9 Pages.

State Intellectual Prop Office of China Notice of Grant of Invention Patent Right for Application No. 202280008241.3 Jun. 12, 2026 7 pages (Including translation).

* cited by examiner

HOUSING, POWER SUPPLY DEVICE, AND VEHICLE

CROSS-REFERENCE TO RELATED APPLICATION

This application is a continuation of International Application No. PCT/CN2022/115114, filed on Aug. 26, 2022, the entire content of which is incorporated herein by reference.

TECHNICAL FIELD

This application relates to the field of battery technologies, and more specifically, to a housing, a power supply device, and a vehicle.

BACKGROUND

Currently, from a perspective of the market development, application of traction batteries is becoming more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With the continuous expansion of the application fields of traction batteries, market demands for the traction batteries are also expanding.

In the development of battery technologies, how the space utilization of the battery in the vehicle is improved is an important research direction in battery technologies.

SUMMARY

This application provides a housing for battery, a power supply device, and a vehicle, which can improve the space utilization of the battery in the vehicle.

According to a first aspect, embodiments of this application provide a housing configured to be mounted on a vehicle body of a vehicle. The housing includes a housing body, a first mounting part, and a second mounting part, where the housing body has an accommodating cavity; the first mounting part is provided on the housing body and is configured to fix a battery in the accommodating cavity; and the second mounting part is provided on the housing body and is configured to fix a plurality of electronic modules in the accommodating cavity.

In the foregoing solution, the battery and the plurality of electronic modules can be fixed in the accommodating cavity of the housing through the first mounting part and the second mounting part of the housing respectively, then the housing is fixed in the vehicle, and the battery and the plurality of electronic modules are mounted as a whole in the vehicle body of the vehicle. This can improve the space utilization of the vehicle, enhance the modal characteristics of the battery, and reduce vehicle noise.

In some embodiments, the housing further includes a third mounting part disposed on an outer surface of the housing body. The third mounting part is configured to fix the housing body to the vehicle body, which has a simple structure and facilitates fixation of the housing.

In some embodiments, the housing body includes a top cover and a bottom cover arranged opposite each other, and the third mounting part is disposed on the top cover and is configured to fix the housing body to a rear seat of the vehicle body.

In the foregoing solution, the battery and the plurality of electronic modules can be arranged as a whole under the rear seat to avoid occupying the space of a front compartment or trunk of the vehicle, thus improving the space utilization.

In some embodiments, the third mounting part includes a connecting portion and a protruding portion that are connected to each other, the connecting portion is fixed to the top cover, and the protruding portion bulges and protrudes toward a direction leaving the top cover and is configured to be fixed to the rear seat.

In the foregoing solution, the top cover is used as the support of the rear seat, which not only meets the requirement for preventing seat sagging and enhances the modal characteristics of the top cover, but also can save the space required for a seat support plate.

In some embodiments, the housing further includes a fourth mounting part disposed on an outer surface of the housing body. The fourth mounting part is configured to fix the housing body to a floor of the vehicle body, which improves the connection strength and stability of the housing, and reduces the vibration of the housing and the noise of the vehicle.

In some embodiments, the fourth mounting part includes a first mounting portion and a second mounting portion disposed on two opposite sides of the housing body, the first mounting portion is configured to fix the housing body to a front floor of the vehicle body, and the second mounting portion is configured to fix the housing body to a rear floor of the vehicle body.

In the foregoing solution, the first mounting portion and the second mounting portion fix the housing on the front floor and the rear floor respectively, so that the housing cannot vibrate along front and rear directions of the vehicle body. This further improves the connection strength and stability of the housing, and reduces the noise of the vehicle.

In some embodiments, the first mounting part includes a bracket and a first positioning portion that are connected to each other, the bracket is configured to be fixed with the battery, and the first positioning portion is disposed on the housing body.

In the foregoing solution, the battery is fixed to the first positioning portion of the housing body through the bracket, avoiding direct mounting on a longitudinal beam or spare tire pool of the vehicle body through the bracket. This enhances modal characteristics of the battery.

In some embodiments, the bracket is detachably connected to the first positioning portion, which facilitates assembly, disassembly, maintenance, and the like of the battery, improving flexibility.

In some embodiments, the bracket includes a second positioning portion and a clamping portion bent from the second positioning portion, the second positioning portion is aligned with and connected to the first positioning portion, and the clamping portion is configured to be fixed with the battery.

In the foregoing solution, the battery is fixed through the clamping portion and is fixed to the housing through the connection between the first positioning portion and the second positioning portion. The first mounting part has simple structure and facilitates the disassembly and assembly of the battery.

In some embodiments, the second mounting part is provided in plurality, and each electronic module is fixed to the housing body through at least one second mounting part, so that each electronic module can be fixed to the housing body, improving the stability of the electronic module.

In some embodiments, the housing body is recessed in a direction of the accommodating cavity to form at least one boss, which increases the strength of the housing.

In some embodiments, the first mounting part is provided on the boss to increase the strength of the bottom of the battery, further improving the stability of the battery.

In some embodiments, the housing body includes a top cover and a bottom cover that are detachably connected, the top cover and the bottom cover enclose the accommodating cavity, facilitating the assembly of the housing body and the assembly, disassembly, and maintenance of the battery and electronic modules.

Embodiments of a second aspect of this application provide a power supply device including a battery, a plurality of electronic modules, and the housing according to any one of the foregoing embodiments. Both the battery and the plurality of electronic modules are integrated into an accommodating cavity of the housing.

Embodiments of a third aspect of this application provide a vehicle including a vehicle body and the power supply device according to any one of the foregoing embodiments, where a housing of the power supply device is mounted on the vehicle body.

BRIEF DESCRIPTION OF DRAWINGS

To describe the technical solutions in some embodiments of this application more clearly, the following briefly describes the accompanying drawings required for describing some embodiments. Apparently, the accompanying drawings in the following descriptions show only some embodiments of this application, and persons of ordinary skill in the art may still derive others drawings from structures shown in these accompanying drawings.

Figure 1:
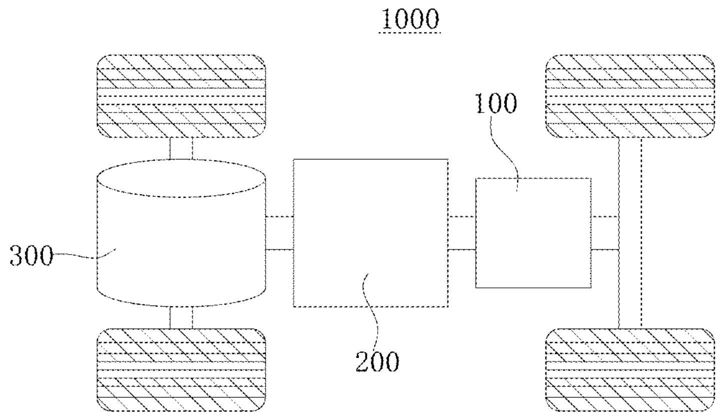
FIG. 1 is a schematic structural diagram of a vehicle according to some embodiments of this application.

Reference signs: vehicle 1000; battery 100; controller 200; motor 300; housing 10; housing body 11; accommodating cavity 11*a*; top cover 111; bottom cover 112; first mounting part 12; bracket 121; first positioning portion 122; second positioning portion 123; clamping portion 124; first positioning hole 122*a*; second positioning hole 123*a*; second mounting part 13; third mounting part 14; connecting portion 141; protruding portion 142; fourth mounting part 15; first mounting portion 151; second mounting portion 152; boss 16; electronic module 400; vehicle body 500; front floor 510; and rear floor 520.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms “include”, “comprise”, and any variations thereof in the specification and claims of this application as well as the foregoing description of drawings are intended to cover non-exclusive inclusions. In the specification, claims, or accompanying drawings of this application, the terms “first”, “second”, and the like are intended to distinguish between different objects rather than to indicate a particular order or relative importance.

Reference to “embodiment” in this application means that specific features, structures, or characteristics described with reference to the embodiment may be included in at least one embodiment of this application. The word “embodiment” appearing in various places in the specification does not necessarily refer to the same embodiment or an independent or alternative embodiment that is exclusive of other embodiments.

In the description of this application, it should be noted that unless otherwise specified and defined explicitly, the terms “mount”, “connect”, “join”, and “attach” should be understood in their general senses. For example, they may refer to a fixed connection, a detachable connection, or an integral connection, and may refer to a direct connection, an indirect connection via an intermediate medium, or an internal communication between two elements. A person of ordinary skills in the art can understand specific meanings of these terms in this application as appropriate to specific situations.

The term “and/or” in this application is only an associative relationship for describing associated objects, indicating that three relationships may be present. For example, A and/or B may indicate three cases: presence of only A; presence of both A and B; and presence of only B. In addition, the character “/” in this application generally indicates an “or” relationship between contextually associated objects.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of power supply devices in the embodiments of this application are merely for illustrative purposes and should not constitute any limitations on this application.

In this application, “a plurality of” means more than two (inclusive).

It should be noted that, without conflict, the embodiments and features in the embodiments in this application may be combined with each other.

The inventors have noticed that with the continuous expansion of the application fields of traction batteries, market demands for the traction batteries are also expanding.

During the development of vehicles, arrangement of batteries is a difficult point. Due to the numerous components in conventional vehicles, there is no space for battery mounting without significantly modifying the vehicle body. After further research, it is found that the battery is typically placed in the front compartment or trunk in conventional vehicles and is mounted on the longitudinal beam or spare tire pool of the vehicle through the bracket, resulting in weak modal characteristics for cantilever beam of the bracket and easy noise generation. In addition, the battery and a plurality of electronic modules of the power supply device are usually arranged separately, which occupies much space, such as the electric drive or thermal management space in the front compartment, thus reducing space utilization.

In view of this, the application provides a technical solution. In this technical solution, a housing is configured to be mounted on a vehicle body, and the housing includes a housing body, a first mounting part, and a second mounting part, where the housing body has an accommodating cavity; the first mounting part is provided on the housing body and is configured to fix the battery in the accommodating cavity; and the second mounting part is provided on the housing body and is configured to fix the plurality of electronic modules in the accommodating cavity. In the foregoing solution, the battery and the plurality of electronic modules can be fixed in the accommodating cavity of the housing through the first mounting part and the second mounting part of the housing respectively, then the housing is fixed in the vehicle, and the battery and the plurality of electronic modules are mounted as a whole in the vehicle body of the vehicle. This can improve the space utilization of the vehicle, enhance the modal characteristics of the battery, and reduce vehicle noise.

Embodiments of this application provide a vehicle that uses a battery as a power source. Referring to FIG. 1, FIG. 1 is a schematic structural diagram of a vehicle 1000 according to some embodiments of this application. The vehicle 1000 may be a fossil fuel vehicle, a natural-gas vehicle, or a new energy vehicle. The new energy vehicle may be a battery electric vehicle, a hybrid electric vehicle, a range-extended electric vehicle, or the like. The battery 100 may be configured to supply power to the vehicle 1000. For example, the battery 100 may be used as an operational power supply for the vehicle 1000. The vehicle 1000 may further include a controller 200 and a motor 300. The controller 200 is configured to control the battery 100 to supply power to the motor 300, for example, to satisfy power needs of start, navigation, and driving of the vehicle 1000.

Figure 2:
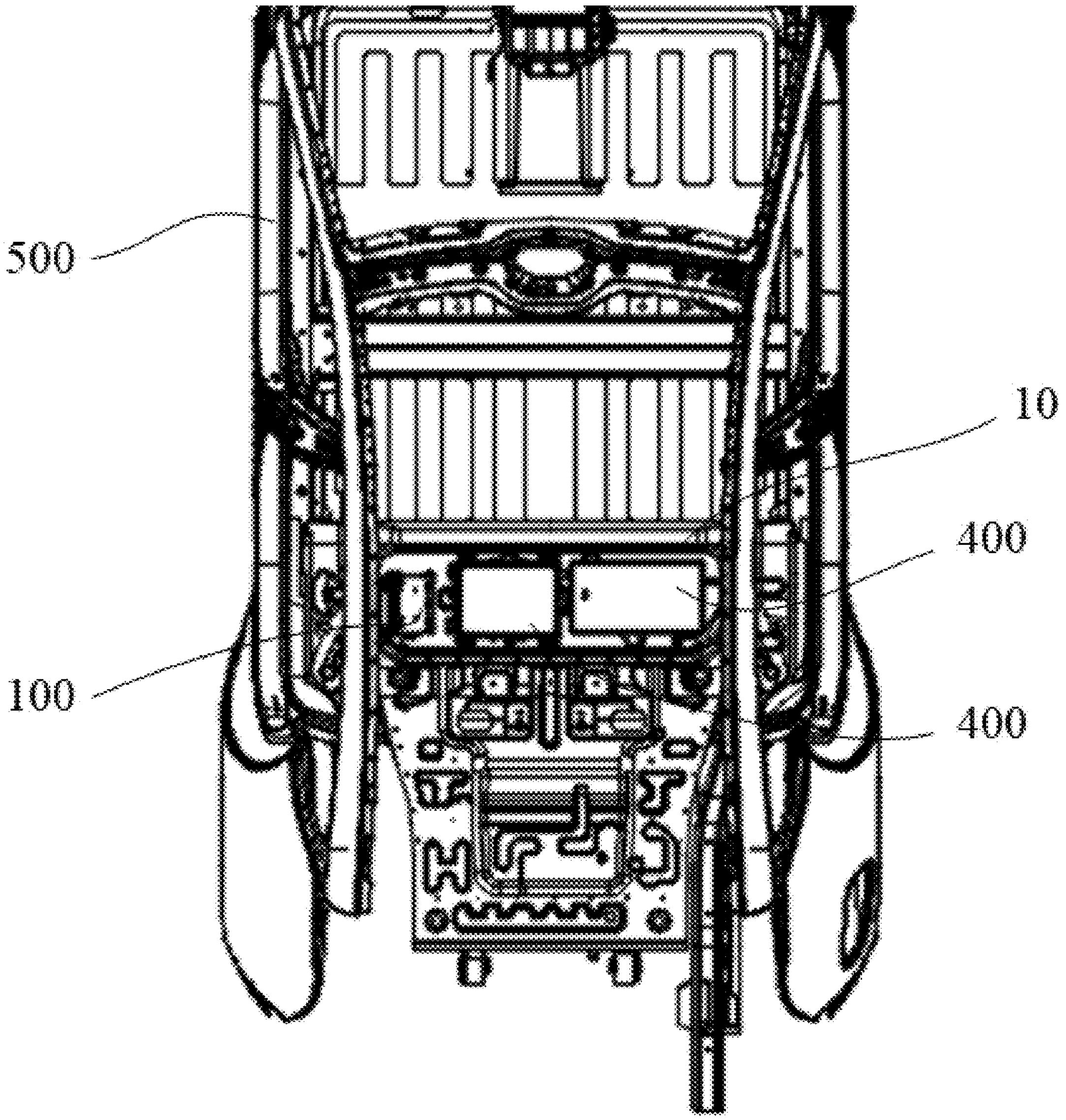
FIG. 2 is a schematic mounting diagram of a power supply device according to some embodiments of this application.
Figure 3:
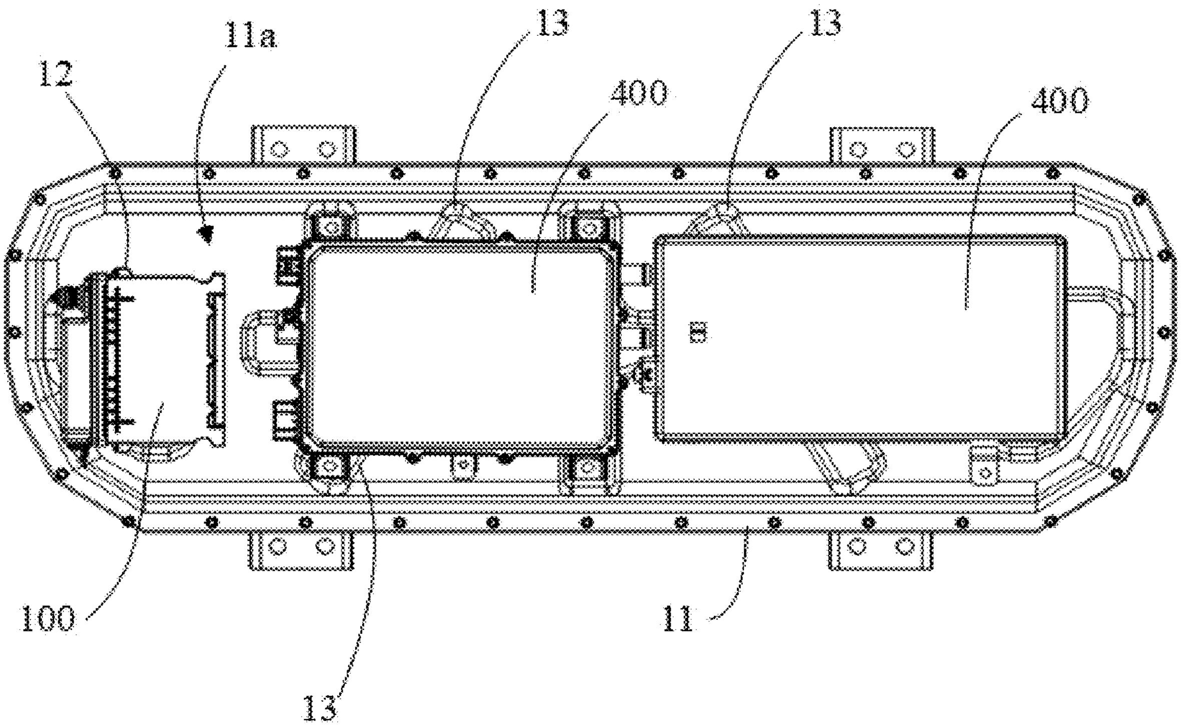
FIG. 3 is a schematic structural diagram of a power supply device according to some embodiments of this application.

Referring to FIG. 2 and FIG. 3, FIG. 2 is a schematic mounting diagram of a power supply device according to some embodiments of this application; and FIG. 3 is a schematic structural diagram of a power supply device according to some embodiments of this application. Embodiments of this application provide a housing 10. The housing 10 is configured to be mounted on the vehicle body 500 of the vehicle 1000, and the housing 10 includes a housing body 11, a first mounting part 12, and a second mounting part 13, where the housing body 11 has an accommodating cavity 11*a*; the first mounting part 12 is provided on the housing body 11 and is configured to fix the battery 100 in the accommodating cavity 11*a*; and the second mounting part 13 is provided on the housing body 11 and is configured to fix a plurality of electronic modules 400 in the accommodating cavity 11*a*.

The electronic module 400 may be a DCDC (direct current converter) power supply module, or may be an integration of electronic components such as relays, sensors, resistors, and capacitors. The plurality of electronic modules 400 and the battery 100 together form the power supply device to supply power to the vehicle 1000. The housing body 11 may include a top cover 111 and a bottom cover 112. The top cover 111 and the bottom cover 112 fit together to jointly define the accommodating cavity 11*a*. The bottom cover 112 may be a hollow structure with one end open, the top cover 111 may be a plate structure, and the top cover 111 covers the open end of the bottom cover 112, so that the top cover 111 and the bottom cover 112 jointly define the accommodating cavity 11*a*. Alternatively, the top cover 111 and the bottom cover 112 may both be a hollow structure with one side open, and the open side of the top cover 111 covers the open side of the bottom cover 112. Certainly, the housing body 11 may be in various shapes, such as a cylindrical shape or a cuboid shape.

In the foregoing solution, the battery 100 and the plurality of electronic modules 400 can be fixed in the accommodating cavity 11*a* of the housing 10 through the first mounting part 12 and the second mounting part 13 of the housing 10 respectively, then the housing 10 is fixed in the vehicle 1000, and the battery 100 and the plurality of electronic modules 400 are mounted as a whole in the vehicle body 500 of the vehicle 1000. This can improve the space utilization of the vehicle 1000, and avoid the mounting of the battery 100 on the longitudinal beam or spare tire pool through the bracket 121, preventing weak modal characteristics of the cantilever beam of the bracket, enhancing the modal characteristics of the battery 100, and reducing noise of the vehicle 1000.

Figure 4:
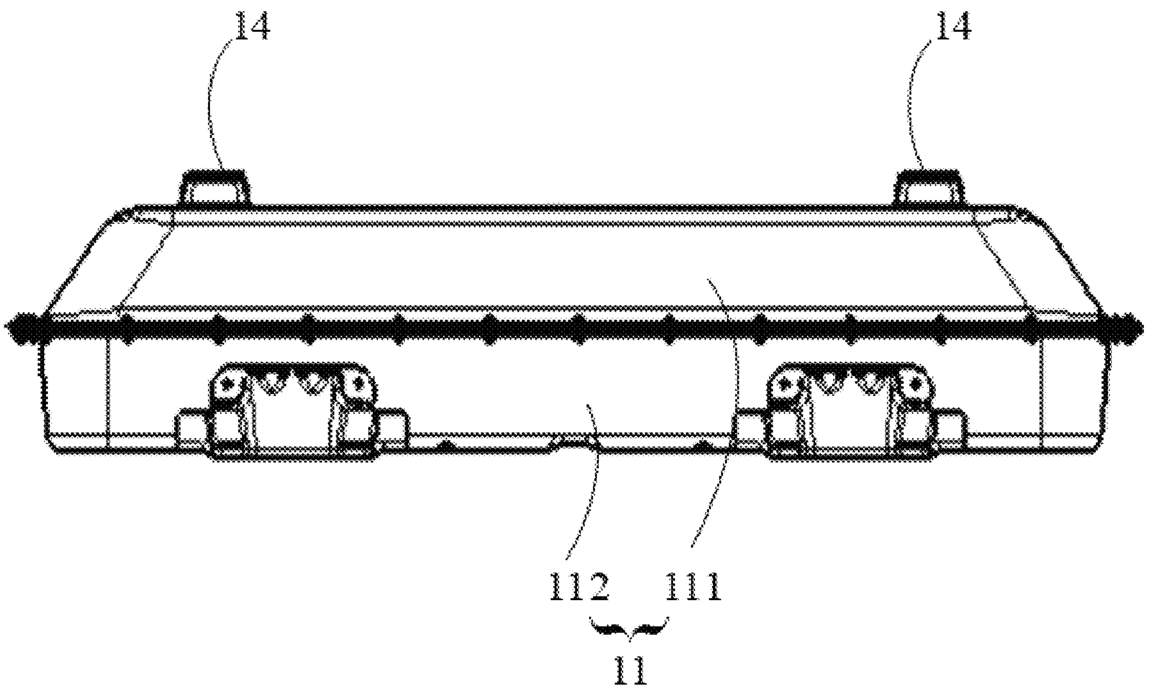
FIG. 4 is a schematic structural diagram of a housing according to some embodiments of this application.

As shown in FIG. 4, FIG. 4 is a schematic structural diagram of a housing according to some embodiments of this application. In some embodiments, the housing 10 further includes a third mounting part 14 disposed on an outer surface of the housing body 11, where the third mounting part 14 is configured to fix the housing body 11 to the vehicle body 500.

The first mounting part 12 and the second mounting part 13 are located in the accommodating cavity 11*a* of the housing body 11, and the third mounting part 14 is located on the outer surface of the housing body 11. The third mounting part 14 may be provided on the top, bottom, or side of the housing body 11, which has a simple structure and facilitates fixation of the housing 10.

In some embodiments, the housing body 11 includes a top cover 111 and a bottom cover 112 arranged opposite each other, and the third mounting part 14 is disposed on the top cover 111 and is configured to fix the housing body 11 to a rear seat of the vehicle body 500.

The top cover 111 and the bottom cover 112 fit together to jointly define the accommodating cavity 11*a*. The third mounting part 14 is provided in plurality, and the plurality of third mounting parts 14 are spaced apart on the top cover 111 to improve the connection strength between the housing 10 and the vehicle body 500. The top cover 111 can be directly used as a support component of the rear seat to support the rear seat.

In the foregoing solution, the battery 100 and the plurality of electronic modules 400 can be arranged as a whole under the rear seat to avoid occupying the space of the front compartment or trunk of the vehicle 1000, fully utilizing the space of the vehicle 1000, and improving the space utilization.

Figure 5:
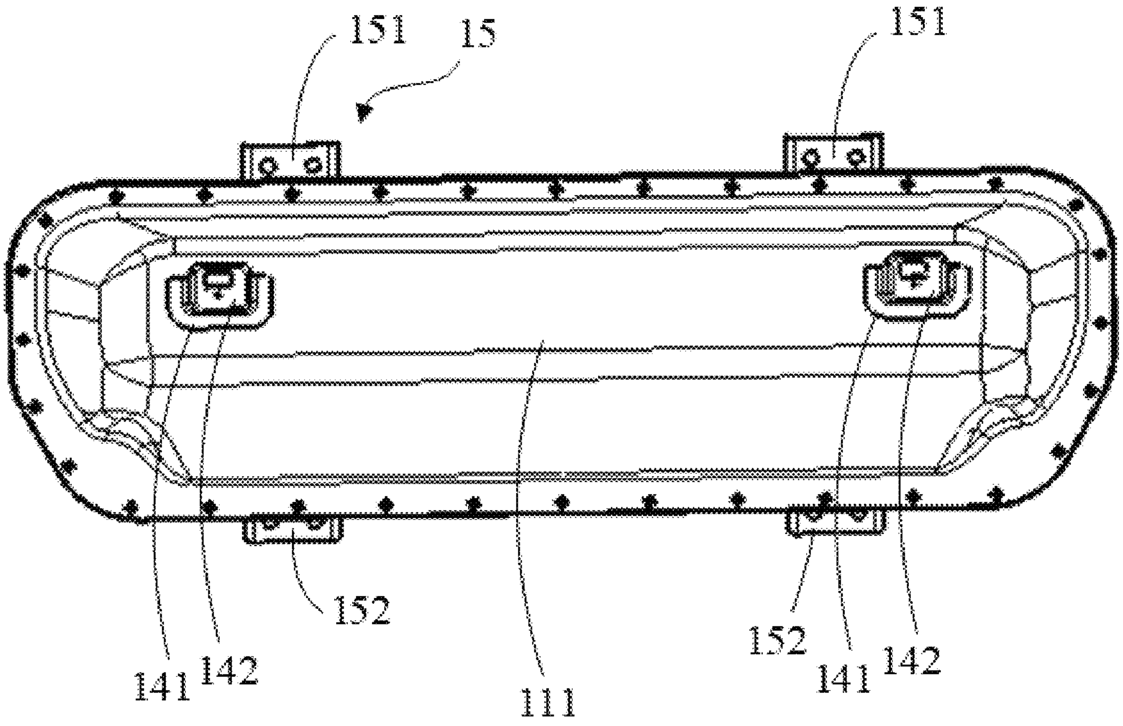
FIG. 5 is a schematic structural diagram of a housing from another perspective according to some embodiments of this application.

As shown in FIG. 5, FIG. 5 is a schematic structural diagram of a housing from another perspective according to some embodiments of this application. In some embodiments, the third mounting part 14 includes a connecting portion 141 and a protruding portion 142 that are connected to each other, the connecting portion 141 is fixed to the top cover 111, and the protruding portion 142 bulges and protrudes toward a direction leaving the top cover 111 and is configured to be fixed to the rear seat.

The connecting portion 141 and the top cover 111 may be connected by welding, bolts, or the like. For example, the connecting portion 141 is annularly welded to the top cover 111. The connecting portion 141 may be disposed around the protruding portion 142 in a circumferential direction, or may be disposed along part of a circumferential side of the protruding portion 142. The protruding portion 142 bulges toward the rear seat, facilitating fixation to the rear seat. The protruding portion 142 may be provided with a threaded hole and fixed to the rear seat by a screw running through the threaded hole, or the protruding portion 142 may be fixed to the rear seat by clamping or the like.

In the foregoing solution, the top cover 111 is used as the support of the rear seat, which not only meets the requirement for preventing seat sagging and enhances the modal characteristics of the top cover 111, but also can save the space required for a seat support plate.

In some embodiments, the housing 10 further includes a fourth mounting part 15 disposed on an outer surface of the housing body 11, where the fourth mounting part 15 is configured to fix the housing body 11 to a floor of the vehicle body 500.

The fourth mounting part 15 may be located on a side or top of the housing body 11, the fourth mounting part 15 may be provided with at least one threaded hole, and the housing body 11 is fixed to the floor of the vehicle body 500 through a bolt. The fourth mounting part 15 may alternatively be fixed to the floor by clamping, pins, or the like. The fourth mounting part 15 may be provided in plurality, and the plurality of fourth mounting parts 15 are spaced apart. The fourth mounting part 15 in this embodiment improves the connection strength and stability of the housing 10, reducing the vibration of the housing 10 and the noise of the vehicle 1000.

Optionally, the third mounting part 14 and the fourth mounting part 15 may be fixed to the vehicle body 500 in different directions, for example, the third mounting part 14 is fixed to the rear seat along the up and down directions of the vehicle body 500, and the fourth mounting part 15 is fixed to the floor along the front and rear directions of the vehicle body 500. This can further enhance the stability of the housing 10 and reduce the vibration of the housing 10.

Figure 6:
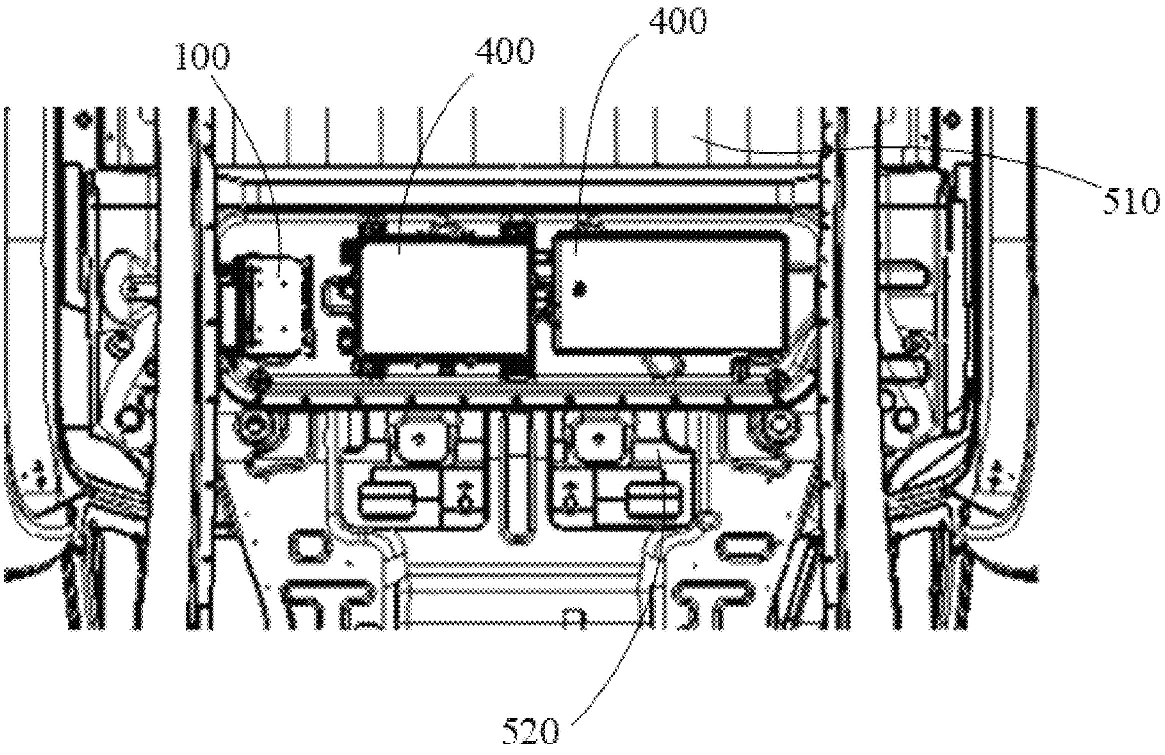
FIG. 6 is a schematic structural diagram of a power supply device according to some embodiments of this application.

Referring to FIG. 5 and FIG. 6, FIG. 5 is a schematic structural diagram of a housing from another perspective according to some embodiments of this application; and FIG. 6 is a schematic structural diagram of a power supply device according to some embodiments of this application. In some embodiments, the fourth mounting part 15 includes a first mounting portion 151 and a second mounting portion 152 disposed on two opposite sides of the housing body 11, the first mounting portion 151 is configured to fix the housing body 11 to a front floor 510 of the vehicle body 500, and the second mounting portion 152 is configured to fix the housing body 11 to a rear floor 520 of the vehicle body 500.

The first mounting portion 151 is located on a front side of the housing body 11, and the second mounting portion 152 is located on a rear side of the housing body 11. Two first mounting portions 151 may be provided, and the two first mounting portions 151 are located at two ends of the front side of the housing body 11 respectively. Two second mounting portions 152 may be provided, and the two second mounting portions 152 are located at two ends of the rear side of the housing body 11 respectively. Certainly, the number and specific positions of the first mounting portion 151 and the second mounting portion 152 may be set as required, and details are not described herein.

In the foregoing solution, the first mounting portion 151 and the second mounting portion 152 fix the housing 10 on the front floor 510 and the rear floor 520 respectively, so that the housing 10 cannot vibrate along front and rear directions of the vehicle body 500. This further improves the connection strength and stability of the housing 10, and reduces the noise of the vehicle 1000.

Figure 7:
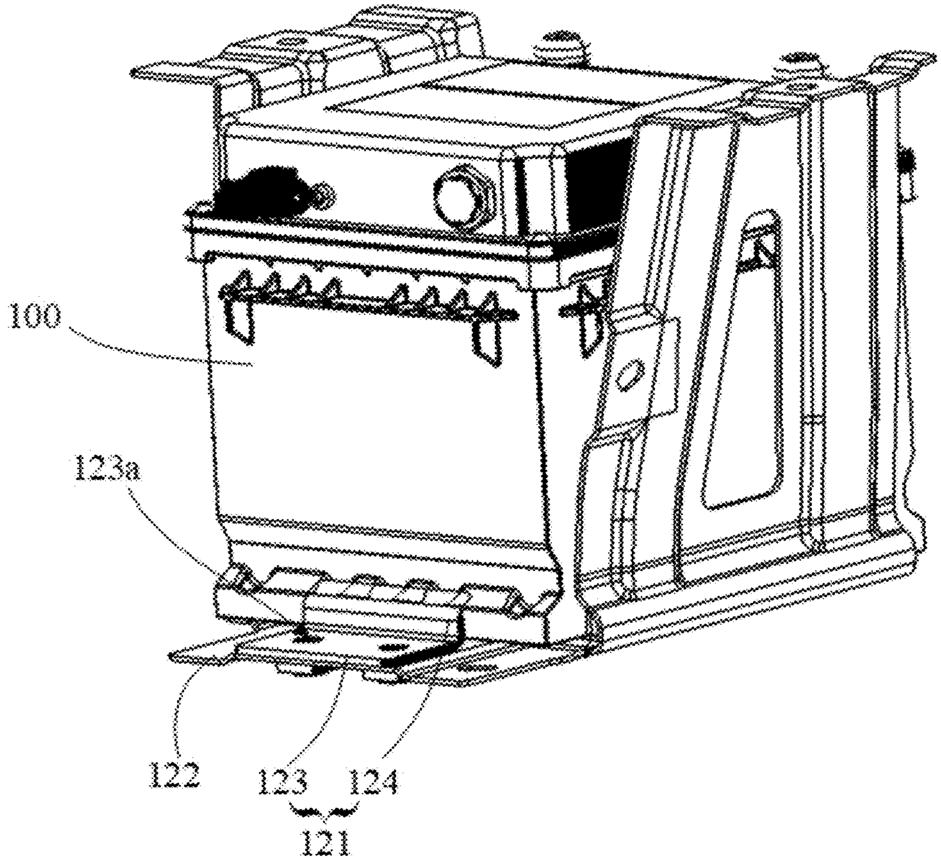
FIG. 7 is a schematic structural diagram of a battery according to some embodiments of this application.
Figure 8:
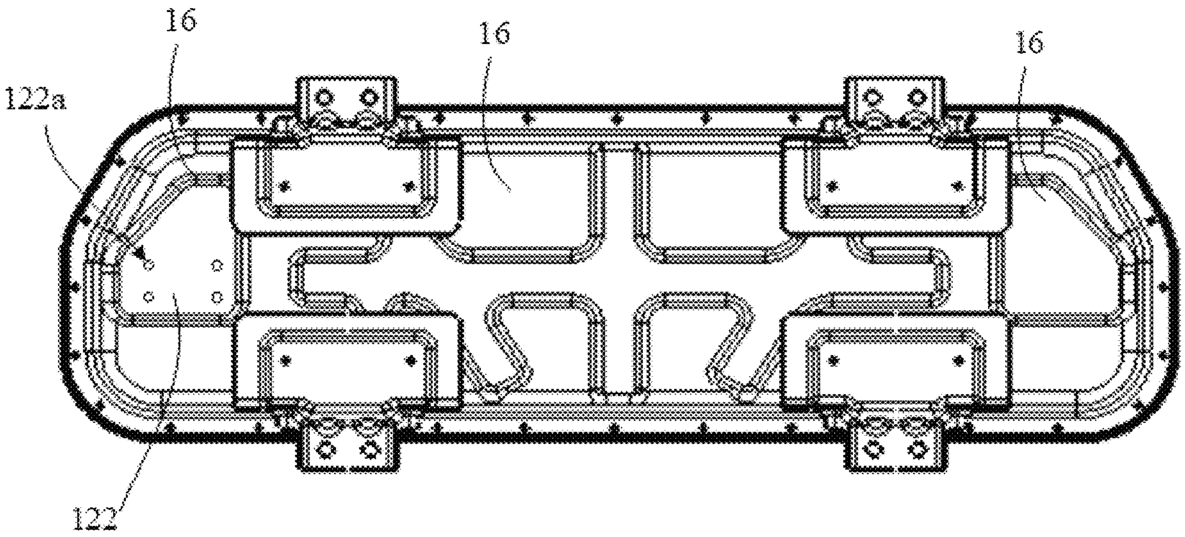
FIG. 8 is a schematic structural diagram of a housing from still another perspective according to some embodiments of this application.

Referring to FIG. 7 and FIG. 8, FIG. 7 is a schematic structural diagram of a battery according to some embodiments of this application; and FIG. 8 is a schematic structural diagram of a housing from still another perspective according to some embodiments of this application. In some embodiments, the first mounting part 12 includes a bracket 121 and a first positioning portion 122 that are connected to each other, the bracket 121 is configured to be fixed with the battery 100, and the first positioning portion 122 is disposed on the housing body 11.

The first positioning portion 122 may be located at a bottom or side of the housing body 11. The first positioning portion 122 may be a part of the housing body 11, and may be fixed to the housing body 11 by welding, clamping, bolts, or the like. Since the battery 100 in this embodiment is fixed in the housing 10 and can be fixed to the vehicle body 500 through the housing 10, the bracket 121 in this embodiment has smaller size than the bracket 121 of conventional batteries 100.

In the foregoing solution, the battery 100 is fixed to the first positioning portion 122 of the housing body 11 through the bracket 121, which avoids direct mounting on the longitudinal beam or spare tire pool of the vehicle body 500 through the bracket 121 and avoids the problem of weak modal characteristics of the cantilever beam of the bracket, thus enhancing modal characteristics of the battery 100.

In some embodiments, the bracket 121 is detachably connected to the first positioning portion 122. The bracket 121 is detachably connected to the first positioning portion 122 by means of screws, pins, clamping, or the like, which facilitates assembly, disassembly, and maintenance of the battery 100, improving flexibility.

In some embodiments, the bracket 121 includes a second positioning portion 123 and a clamping portion 124 bent from the second positioning portion 123, the second positioning portion 123 is aligned with and connected to the first positioning portion 122, and the clamping portion 124 is configured to be fixed with the battery 100.

The first positioning portion 122 may be part of the bottom of the housing 10, the first positioning portion 122 is provided with a first positioning hole 122*a*, and the second positioning portion 123 is provided with a second positioning hole 123*a*. The first positioning hole 122*a* is aligned with the second positioning hole 123*a*, and the first positioning portion 122 and the second positioning portion 123 are fitted with each other, and then, the screw runs through both the first positioning portion 122 and the second positioning portion 123 to fix the bracket 121 to the housing body 11. Both the first positioning hole 122*a* and second positioning hole 123*a* may be provided in plurality, so as to improve the connection strength. The clamping portion 124 may bend upward and extend relative to the second positioning portion 123 and is clamped to the battery 100.

In the foregoing solution, the battery 100 is fixed through the clamping portion 124 and is fixed to the housing 10 through the connection between the first positioning portion 122 and the second positioning portion 123. The first mounting part 12 has simple structure and facilitates the assembly and disassembly of the battery 100.

In some embodiments, the second mounting part 13 is provided in plurality, and each electronic module 400 is fixed to the housing body 11 through at least one second mounting part 13. This allows each electronic module 400 to be fixed to the housing body 11, improving the stability of the electronic module 400.

Optionally, a plurality of the second mounting parts 13 may be disposed on a circumferential side of each electronic module 400, and the plurality of the second mounting parts 13 are spaced apart to fix the electronic module 400 to a side portion of the housing body 11, further enhancing the stability of the electronic module 400.

In some embodiments, the housing body 11 is recessed in a direction of the accommodating cavity 11*a* to form at least one boss 16. The protruding portion 142 may be provided at a bottom of the housing 10, with the boss 16 bulging upward, increasing the strength of the housing 10.

In some embodiments, the first mounting part 12 is provided on the boss 16. The first positioning portion 122 may be the boss 16 or a part of the boss 16, or the first positioning hole 122*a* is located on the boss 16; and the first positioning portion 122 may be welded to the boss 16. The boss 16 is a mounting boss 16 for the battery 100, which increases the strength of a bottom of the battery 100, and further improves the stability of the battery 100.

In some embodiments, the housing body 11 includes a top cover 111 and a bottom cover 112 that are detachably connected, and the top cover 111 and the bottom cover 112 enclose the accommodating cavity 11*a*, facilitating the assembly of the housing body 11, and facilitating the assembly, disassembly, and maintenance of the battery 100 and electronic modules 400.

Embodiments of a second aspect of this application provide a power supply device including a battery 100, a plurality of electronic modules 400, and the housing 10 according to any one of the foregoing embodiments. Both the battery 100 and the plurality of electronic modules 400 are integrated into an accommodating cavity 11*a* of the housing 10. Since the power supply device uses all of the technical solutions in all the foregoing embodiments, it has at least all of the beneficial effects brought by the technical solutions of the foregoing embodiments. Details are not described herein.

Embodiments of a third aspect of this application provide a vehicle 1000 including a vehicle body 500 and the power supply device according to any one of the foregoing embodiments, where a housing 10 of the power supply device is mounted on the vehicle body 500.

According to some embodiments of this application, this application provides a housing 10 configured to be mounted on a vehicle body 500 of the vehicle 1000. The housing 10 includes a housing body 11, a first mounting part 12, and a second mounting part 13, where the housing body 11 has an accommodating cavity 11*a*; the first mounting part 12 is provided on the housing body 11 and is configured to fix the battery 100 in the accommodating cavity 11*a*; and the second mounting part 13 is provided on the housing body 11 and is configured to fix a plurality of electronic modules 400 in the accommodating cavity 11*a*. The housing 10 further includes a third mounting part 14 disposed on an outer surface of the housing body 11, where the third mounting part 14 is configured to fix the housing body 11 to the vehicle body 500. The housing body 11 includes a top cover 111 and a bottom cover 112 arranged opposite each other, and the third mounting part 14 is disposed on the top cover 111 and is configured to fix the housing body 11 to a rear seat of the vehicle body 500.

In conclusion, it should be noted that the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A housing configured to be mounted on a vehicle body of a vehicle, comprising:
a housing body having an accommodating cavity;
a first mounting part provided on the housing body and configured to fix a battery in the accommodating cavity;
a second mounting part provided on the housing body and configured to fix a plurality of electronic modules in the accommodating cavity;
a third mounting part disposed on an outer surface of the housing body, and configured to fix the housing body to the vehicle body;
wherein the housing body comprises a top cover and a bottom cover arranged opposite each other, and the third mounting part is disposed on the top cover and is configured to fix the housing body to a rear seat of the vehicle body;
a fourth mounting part disposed on an outer surface of the housing body, and configured to fix the housing body to a floor of the vehicle body; and
wherein the fourth mounting part comprises a first mounting portion and a second mounting portion disposed on two opposite sides of the housing body, the first mounting portion is configured to fix the housing body to a front floor of the vehicle body, and the second mounting portion is configured to fix the housing body to a rear floor of the vehicle body.

2. The housing according to claim 1, wherein the third mounting part comprises a connecting portion and a protruding portion that are connected to each other, the connecting portion is fixed to the top cover, and the protruding portion bulges and protrudes toward a direction leaving the top cover and is configured to be fixed to the rear seat.

3. The housing according to claim 1, wherein the first mounting part comprises a bracket and a first positioning portion that are connected to each other, the bracket is configured to be fixed with the battery, and the first positioning portion is disposed on the housing body.

4. The housing according to claim 3, wherein the bracket comprises a second positioning portion and a clamping portion bent from the second positioning portion, the second positioning portion is aligned with and connected to the first positioning portion, and the clamping portion is configured to be fixed with the battery.

5. A power supply device, comprising:
the housing according to claim 1; and
a battery and a plurality of electronic modules disposed in an accommodating cavity of the housing.

6. A vehicle, comprising:

a vehicle body; and the power supply device according to claim 5, wherein a housing of the power supply device is mounted on the vehicle body.

* * * * *